(12) United States Patent
Dong et al.

(10) Patent No.: US 11,824,156 B2
(45) Date of Patent: Nov. 21, 2023

(54) SECONDARY LITHIUM-ION BATTERIES COMPRISING IN SITU THERMAL CURABLE SOLID COMPOSITE ELECTROLYTE

(71) Applicant: Nano and Advanced Materials Institute Limited, Hong Kong (HK)

(72) Inventors: Ou Dong, Hong Kong (HK); Sing Ho Lo, Hong Kong (HK); Zhengfu Qiu, Hong Kong (HK); Wing Lung Hon, Hong Kong (HK); Jianping Han, Hong Kong (HK); Yong Zhu, Hong Kong (HK); Shengbo Lu, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 125 days.

(21) Appl. No.: 17/460,303

(22) Filed: Aug. 29, 2021

(65) Prior Publication Data

US 2022/0149424 A1 May 12, 2022

Related U.S. Application Data

(60) Provisional application No. 63/110,374, filed on Nov. 6, 2020.

(51) Int. Cl.
*H01M 10/056* (2010.01)
*H01M 10/0525* (2010.01)
(Continued)

(52) U.S. Cl.
CPC ..... *H01M 10/056* (2013.01); *H01M 10/0525* (2013.01); *H01M 4/133* (2013.01);
(Continued)

(58) Field of Classification Search
None
See application file for complete search history.

(56) References Cited

U.S. PATENT DOCUMENTS 6,096,234 A   8/2000  Nakanishi et al.
8,318,361 B2  11/2012 Yu et al.
(Continued)

FOREIGN PATENT DOCUMENTS

CN    100343330 C   10/2007
CN    108376796 A    8/2018
(Continued)

OTHER PUBLICATIONS

Shuru Chen et al. "Critical Parameters for Evaluating Coin Cells and Pouch Cells of Rechargeable Li-Metal Batteries." Jul. 3, 2019, p. 1094-1105.
(Continued)

*Primary Examiner* — Nathanael T Zemui
(74) *Attorney, Agent, or Firm* — Idea Intellectual Limited; Margaret A. Burke; Sam T. Yip (57) ABSTRACT

The present invention provides a rechargeable lithium-ion battery with an in situ thermally-curable electrolyte. The thermally-curable electrolyte is cured from the thermally-curable electrolyte precursor solution including a first crosslinking agent, a second crosslinking agent, an initiator, an electrolyte solvent, an electrolyte salt, one or more electrolyte additives, and one or more monomers or a monomer polymerization product. The viscosity of the thermally-curable electrolyte precursor solution is below 200 cps such that the thermally-curable electrolyte precursor solution is infiltrated within the separator and the pores inside the cathode and anode layers then cured to form porous separator and porous electrodes fully permeated with a solid electrolyte.

14 Claims, 6 Drawing Sheets

(51) Int. Cl.
  *H01M 4/525* (2010.01)
  *H01M 4/02* (2006.01)
  *H01M 4/134* (2010.01)
  *H01M 4/133* (2010.01)
  *H01M 4/505* (2010.01)

(52) U.S. Cl.
  CPC ............ *H01M 4/134* (2013.01); *H01M 4/505* (2013.01); *H01M 4/525* (2013.01); *H01M 2004/027* (2013.01); *H01M 2004/028* (2013.01); *H01M 2300/0082* (2013.01); *H01M 2300/0085* (2013.01)

(56) References Cited

U.S. PATENT DOCUMENTS

| | | | |
|---|---|---|---|
| 9,837,685 | B2 | 12/2017 | Jeon et al. |
| 2012/0216394 | A1* | 8/2012 | Kitaura ............... H01M 10/052 29/623.2 |
| 2019/0067748 | A1* | 2/2019 | Saeki ...................... H01M 4/13 |
| 2021/0313616 | A1* | 10/2021 | Villaluenga ............ C08K 3/105 |
| 2022/0340702 | A1* | 10/2022 | Park ........................ C08K 5/109 |

FOREIGN PATENT DOCUMENTS

| | | |
|---|---|---|
| CN | 110048153 A | 7/2019 |
| CN | 110808409 A | 2/2020 |
| CN | 111748095 A | 10/2020 |
| EP | 0555114 A1 | 8/1993 |
| JP | H1186911 A | 3/1999 |
| JP | H11185817 A | 7/1999 |
| JP | H11288738 A | 10/1999 |
| JP | 3215436 B2 | 10/2001 |
| JP | 3301378 B2 | 7/2002 |
| JP | 2005085638 A | 3/2005 |
| JP | 4458213 B2 | 4/2010 |
| KR | 100744835 B1 | 8/2007 |

OTHER PUBLICATIONS

Sungguk Park et al. "Quasi-Solid-State Electrolyte Synthesized Using a Thiol-Ene Click Chemistry for Rechargeable Lithium Metal Batteries with Enhanced Safety." ACS Applied Materials & Interfaces, 12, 2020, p. 19553-19562.

Office Action of corresponding China Patent Application No. 202111212563.3 dated Jul. 18, 2023.

* cited by examiner

SECONDARY LITHIUM-ION BATTERIES COMPRISING IN SITU THERMAL CURABLE SOLID COMPOSITE ELECTROLYTE

CROSS-REFERENCE TO RELATED APPLICATIONS

The present application claims priority from a U.S. provisional patent application Ser. No. 63/110,374 filed Nov. 6, 2020, and the disclosure of which is incorporated herein by reference in its entirety.

FIELD OF THE INVENTION

The present invention relates to a rechargeable lithium-ion battery, in particular with an in situ thermally-curable electrolyte, which is infiltrated within the separator and the pores inside the cathode and anode layers then cured to form porous separator and porous electrodes fully permeated with a solid electrolyte.

BACKGROUND

Over the past decades, demand for rechargeable and high-energy density lithium-ion batteries (LIBs) have grown significantly due to the rapid development of portable electronic devices, electric vehicles (EVs), and grid-scale energy storage systems (ESSs). However, these LIBs typically including a cathode, an anode, a separator and liquid electrolyte have a critical drawback related to safety issues such as: leakage, fires, and explosion due to the low-boiling point organic electrolytes. Liquid electrolyte is usually provided by dissolving Li salt into organic carbonate solvents, which are flammable and with lower thermal stability. Although Li metal, an idea anode material, has higher theoretical specific capacity (approximately 3,860 mAhg-1) which is ten times larger than that of graphite (approximately 370 mAhg-1). However, the application of Li metal on commercial rechargeable lithium battery is limited due to the induction of Li dendrite growth and nucleation during the charging/discharging process of the battery. Li dendrite can penetrate the separator easily and result in battery short circuit. In addition, the heat produced by battery short circuit increases battery's temperature and brings a high risk of fire of the flammable electrolyte solvent.

Although, the rechargeable lithium-ion battery with a solid electrolyte as the ionic conductor substituting for the flammable liquid electrolyte, has greatly improve the safety of battery. However, methods for preparing rechargeable lithium-ion battery with the solid electrolyte are usually complicated and required more steps to fabricate, resulting in time-consuming and inefficient.

Therefore, there is a need in the art for providing an efficient preparation method for solid electrolyte with high ionic conductivity and electrochemical stability of the lithium battery.

SUMMARY OF THE INVENTION

The present invention is not to be limited in scope by any of the following descriptions. The following examples or embodiments are presented for exemplification only.

Accordingly, a first aspect of the present invention provides a rechargeable lithium-ion battery with an in situ thermally-curable electrolyte. The lithium-ion battery includes at least one cathode, at least one anode, at least one porous separator, a solid electrolyte prepared by a thermally-curable electrolyte precursor solution. The cathode includes one or more layers selected from lithium manganese oxide (LMO), lithium cobalt oxide (LCO), lithium nickel manganese cobalt oxide (NMC), and/or lithium iron phosphate (LFP). The anode includes one or more layers selected from carbon black, carbon nanotubes, lithium metal, graphene, and/or graphite. The porous separator has a porosity from approximately 30% to 90%. The thermally-curable electrolyte precursor solution comprises a first crosslinking agent, a second crosslinking agent, an initiator, an electrolyte solvent, an electrolyte salt, one or more electrolyte additives, and one or more monomers or a monomer polymerization product. The viscosity of the thermally-curable electrolyte precursor solution is below 200 cps such that the thermally-curable electrolyte precursor solution is infiltrated within the separator and the pores inside the cathode and anode layers then cured to form porous separator and porous electrodes fully permeated with a solid electrolyte.

In a first embodiment of the first aspect of the present invention, there is provided a rechargeable lithium-ion battery with an in situ thermally-curable electrolyte where the first crosslinking agent has below formula (I):

$$C=C-(R_1)_n-(R_2)_m-(R_3)_j-(R_4)_k-C=C \quad (I)$$

wherein $R_1$, $R_2$, $R_3$ and $R_4$ are jointly or independently selected from epoxy, alkoxy, urethane, CN, ethylene oxide, propylene oxide and alkyl; n is 5000 or less; m, j and k are from 1 to 5000.

In a second embodiment of the first aspect of the present invention, there is provided a rechargeable lithium-ion battery with an in situ thermally-curable electrolyte where the second crosslinking agent has below formula (II):

$$R_x-S-H \quad (II)$$

wherein R is selected from epoxy, ester, and alkyl groups; x is from 1 to 5000.

In a third embodiment of the first aspect of the present invention, there is provided a rechargeable lithium-ion battery with an in situ thermally-curable electrolyte where the initiator is selected from azobis(iso-butyronitrile) (AIBN), 2,2'-azobis(2,4-dimethylvaleronitrile) (AVBN) and azobis-dimethyl-valeronitrile (AMVN), dimethyl 2,2'-azobis(2-methylpropionate), 2,2'-azobis[2-(2-imidazolin-2-yl)-propane] dihydrochloride, cumene hydroperoxide or di-tert-butyl peroxide.

In a fourth embodiment of the first aspect of the present invention, there is provided a rechargeable lithium-ion battery with an in situ thermally-curable electrolyte where the first crosslinking agent is in amount of approximately from 1% to 15% by weight.

In a fifth embodiment of the first aspect of the present invention, there is provided a rechargeable lithium-ion battery with an in situ thermally-curable electrolyte where the second crosslinking agent is in amount of approximately from 1% to 15% by weight.

In a sixth embodiment of the first aspect of the present invention, there is provided a rechargeable lithium-ion battery with an in situ thermally-curable electrolyte where the initiator is in amount of approximately from 1% to 5% by weight.

In a seventh embodiment of the first aspect of the present invention, there is provided a rechargeable lithium-ion battery with an in situ thermally-curable electrolyte where the electrolyte solvent is in amount of approximately from 65% to 86% by weight.

In an eighth embodiment of the first aspect of the present invention, there is provided a rechargeable lithium-ion battery with an in situ thermally-curable electrolyte where the electrolyte salt is selected from $LiPF_6$, $LiAsF_6$, $LiClO_4$, LiTFSi, $LiBF_4$, $LiCF_3SO_3$, $LiN(CF_3SO_2)_2$, or $LiSBF_6$.

In a ninth embodiment of the first aspect of the present invention, there is provided a rechargeable lithium-ion battery with an in situ thermally-curable electrolyte where the additives are selected from one or more of fluoroethylene carbonate, dimethylglycol, orthoformate fluoride, tris(2,2,2-trifluoroethyl)orthoformate, 1,1,1,3,3,3-hexafluoro-2-propanol, membrane-forming agents, fire retardants, and ceramic particles.

In a tenth embodiment of the first aspect of the present invention, there is provided a rechargeable lithium-ion battery with an in situ thermally-curable electrolyte where the thermally-cured electrolyte precursor solution is cured at 40 to 80° C. for approximately from 20 min to 6 hours.

In an eleventh embodiment of the first aspect of the present invention, the one or more monomers include polyether and pentaerythritol tetrakis(3-mercaptopropionate), or a mixture thereof.

In a twelfth embodiment of the first aspect of the present invention, the monomer polymerization product is selected from poly propylene oxide-co-ethylene oxide tri-acrylate.

In addition, a second aspect of the present invention provides a method for fabricating a rechargeable lithium-ion battery with an in situ thermally-curable electrolyte. The method includes following steps: stacking or rolling at least one cathode, at least one porous separator and at least one anode to form a layered structure, inserting the layered structure into a battery housing, providing a thermally-curable electrolyte precursor solution and pouring the thermally-curable electrolyte precursor solution into the battery housing, and sealing the battery housing and heating the battery housing to cure the electrolyte precursor solution a solid electrolyte and form a separator fully infused with the solid electrolyte.

In one embodiment of the second aspect of the present invention, it is provided a method for fabricating a rechargeable lithium-ion battery with an in situ thermally-curable electrolyte where the battery is a pouch battery or a cylindrical battery.

BRIEF DESCRIPTION OF THE DRAWINGS

Embodiments of the present invention are described in more detail hereinafter with reference to the drawings.

DEFINITION

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

DETAILED DESCRIPTION

Figure 1:
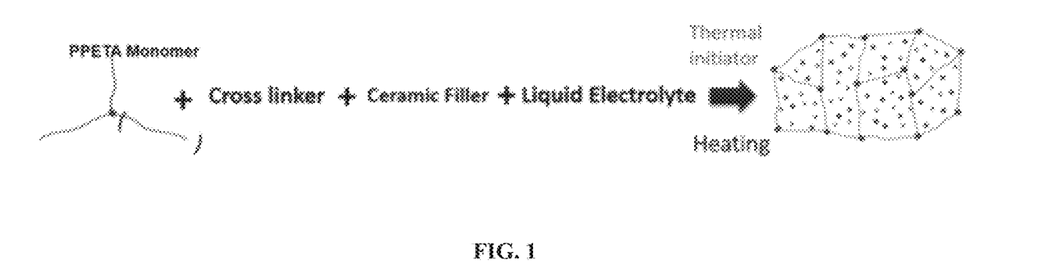
FIG. 1 illustrates the formation of the solid electrolyte after heating.

The present invention provides a rechargeable lithium-ion battery with an in situ thermally-curable electrolyte and a preparation thereof. The rechargeable lithium-ion battery comprises at least one cathode, at least one anode, at least one porous separator, and a thermally-curable electrolyte. Advantageously, the viscosity of the thermally-curable electrolyte precursor solution is below 200 cps such that the thermally-curable electrolyte precursor solution is infiltrated within the separator and the pores inside the cathode and anode layers then cured at 40 to 80° C. for approximately from 20 min to 6 hours to form porous separator and porous electrodes fully permeated with a solid electrolyte. FIG. 1 illustrates the formation of the solid electrolyte after heating the thermally-curable electrolyte precursor solution. The thermally-curable electrolyte precursor solution is usually prepared by the following steps: (1) providing an electrolyte solvent; (2) adding electrolyte salt into the electrolyte solvent and completely dissolved; (3) adding a monomer polymerization product, additives, crosslinking agents, and initiator and mixing thereof with the electrolyte solution from (2) by a stirring bar at room temperature; (4) after 2 to 5 hours of stirring, obtaining the thermally-curable electrolyte precursor solution and being ready for packaging into a battery including but not limited to a pouch battery and a cylindrical battery. In this embodiment, the monomer polymerization product is poly propylene oxide-co-ethylene oxide tri-acrylate (PPETA). Other than the monomer polymerization product, monomers such as a mixture of polyether and pentaerythritol tetrakis(3-mercaptopropionate) (PETMP) can also be used in other embodiments of the present invention. The additives used in this embodiment include ceramic fillers. Other possible additives include fluoroethylene carbonate, dimethylglycol, orthoformate fluoride, tris(2,2,2-trifluoroethyl)orthoformate, 1,1,1,3,3,3-Hexafluoro-2-propanol, lithium difluoro(ethanedioato)borate (LiDFOB), lithium bis(oxalate)borate (LiBOB), vinylene carbonate (VC), 1,3-propane sultone (PS), membrane-forming agents and fire retardants according to some other embodiments of the present invention. In addition, after (4) stirring the mixture from (3) for 2 to 5 hours, the mixture is added into a stacked pouch cell with three-side packaged. After sealing the forth side of the pouch cell, the battery is heated approximately 70° C. to cure the electrolyte precursor solution into a solid state electrolyte. In other embodiments, curing temperature from approximately 40° C. to 80° C. is also feasible to cure the thermally-curable electrolyte precursor solution into a solid electrolyte before packaging into a battery.

Figure 2:
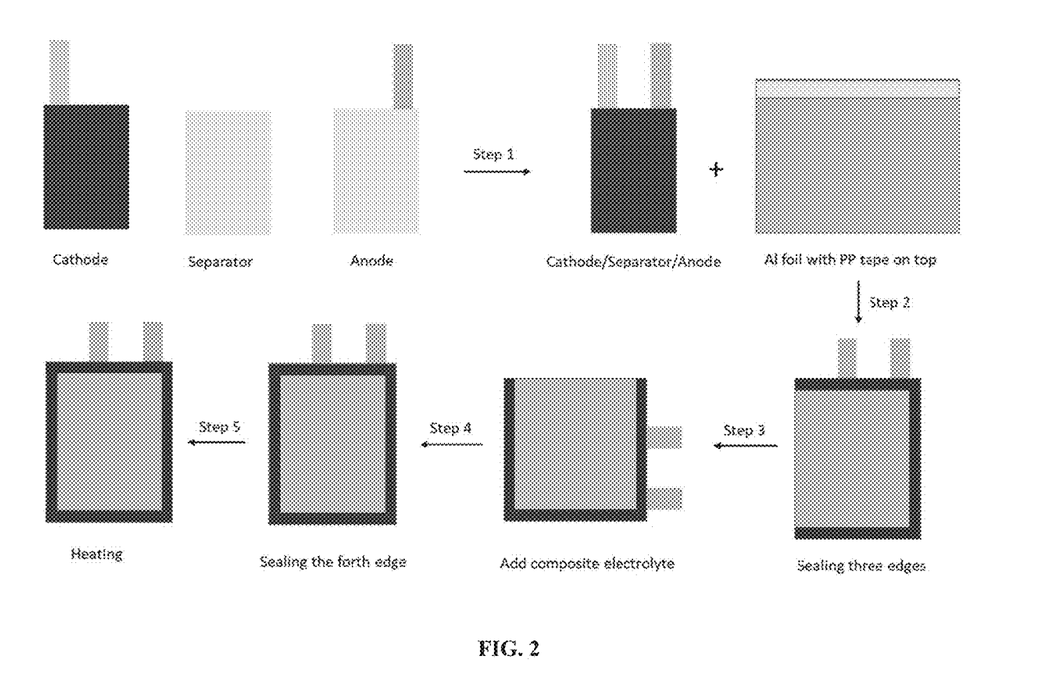
FIG. 2 illustrates the process to fabricate a pouch cell containing a single layer of thermally curable electrolyte in one embodiment of the present invention.

As shown in FIG. 2, it illustrates the process flow of a pouch cell containing a single layer of thermally curable electrolyte formed from the thermally-curable electrolyte precursor. The process is as follows: (1) stacking a cathode, a separator and an anode to form a stacked structure containing the cathode, separator and anode; (2) sealing three sides of an aluminum foil with the stacked structure, where one layer of polypropylene (PP) attached on one side of the aluminum foil assists sealing of terminals' area (3) pouring the thermally-curable electrolyte precursor solution into the pouch cell; (4) sealing the remaining side of the pouch cell; (5) heating the sealed pouch cell to form the pouch cell incorporated with solid electrolyte.

The amount of the electrolyte solvent is approximately from 65% to 86% by weight of the thermally-curable electrolyte precursor solution and the electrolyte solvent is selected from ethylene carbonate (EC), ethyl-methyl carbonates (EMC), diethyl carbonates (DEC), dimethyl carbonates (DMC), propylene carbonate (PC), ethyl propionate (EP), or methyl butanoate (MB). The amount of the electrolyte salt is approximately from 10% to 30% by weight of the thermally-curable electrolyte precursor solution and the electrolyte salt is selected from $LiPF_6$, $LiAsF_6$, $LiClO_4$, LiTFSI, $LiBF_4$, $LiCF_3SO_3$, $LiN(CF_3SO_2)_2$, LiFSI or $LiSBF_6$. The amount of the additives is approximately from 0.5% to 50% by weight of the thermally-curable electrolyte precursor solution and the additives are selected from fluoroethylene carbonate, dimethylglycol, orthoformate fluoride, tris(2,2,2-trifluoroethyl)orthoformate, 1,1,1,3,3,3-hexafluoro-2-propanol, lithium difluoro(ethanedioato)borate (LiDFOB), lithium bis(oxalate)borate (LiBOB), vinylene carbonate (VC), 1,3-propane sultone (PS), membrane-forming agents, fire retardants, or ceramic particles. Additives such as ceramic particles or fillers further improve the mechanical properties of the solid electrolyte, avoiding short circuits. Meanwhile, the amount of the initiator is in an amount of approximately 1% to 5% by weight of the thermally-curable electrolyte precursor solution and the initiator is selected from azobis(iso-butyronitrile) (AIBN), 2,2'-azobis(2,4-dimethylvaleronitrile) (AVBN) and azobis-dimethyl-valeronitrile (AMVN), dimethyl 2,2'-azobis(2-methylpropionate), 2,2'-azobis[2-(2-imidazolin-2-yl)-propane] dihydrochloride, cumene hydroperoxide or di-tert-butyl peroxide.

There are one or more crosslinking agents in the thermally-curable electrolyte precursor solution. A first crosslinking agent is represented by formula (I):

(I), wherein $R_1$, $R_2$, $R_3$ and $R_4$ in formula (I) are jointly or independently selected from epoxy, alkoxy, urethane, CN, ethylene oxide, propylene oxide and alkyl; n is 5000 or less; m is from 1 to 5000. n is 5000 or less; and m, j and k are from 1 to 5000; n, m, j and k are integers, respectively. A second crosslinking agent is represented by formula (II):

(II), where R in formula (II) is selected from epoxy, ester, or alkyl groups; x is from 1 to 5000; x is an integer.

Figure 3:
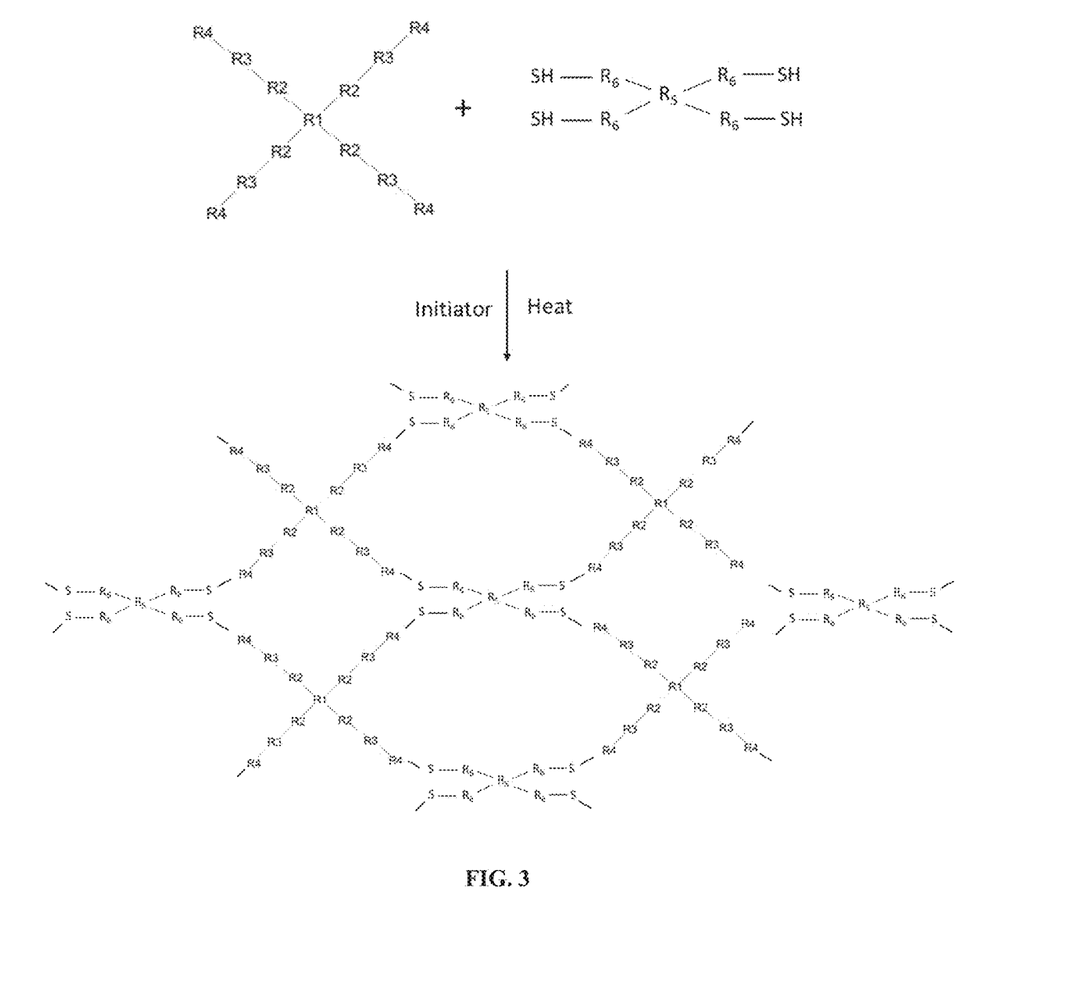
FIG. 3 illustrates the crosslinking reaction of the first crosslinking agent and the second crosslinking agent in one embodiment of the present invention.

FIG. 3 illustrates an example of the crosslinking reaction of the first crosslinking agent and the second crosslinking agent. The crosslinking reaction is a thiol-ene reaction, where an ene group (—C═C—) at one or both ends of the R groups of the first crosslinking agent when one or both of n and m is 4 and the thiol group (—S—H) group of the second crosslinking agent radicals are reacted under heat to crosslink with each other to form a polymerized or a gel-like solid structure. The crosslinked polymerized or gel-like solid structure has good elasticity which is crucial to maintain good contact of electrolyte with electrode. Since there is always volume expansion/shrinkage of Li metal during charge/discharge cycles, it is therefore crucial for the solid electrolyte to have good elasticity. In addition, the crosslinked polymerized or gel-like solid structure also has good mechanical property which can prevent Li dendrite from penetrating the separator during charge/discharge cycles and avoid short circuit in lithium-ion battery.

EXAMPLES

Figure 4A:
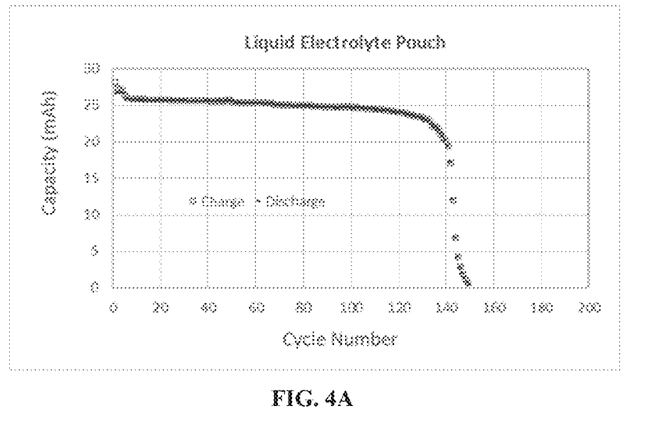
FIGS. 4A to 4D show the cycling performance comparison of pouch cells with liquid electrolyte and solid electrolyte.
Figure 4B:
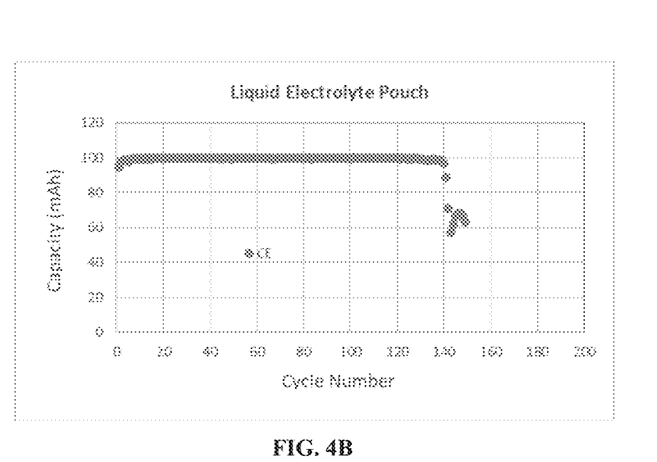
Figure 4C:
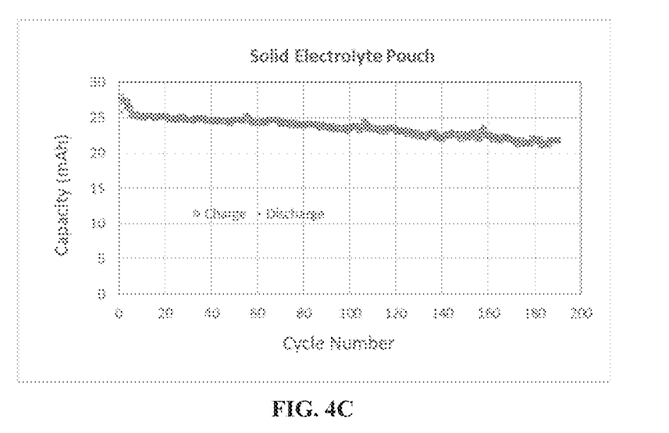
Figure 4D:
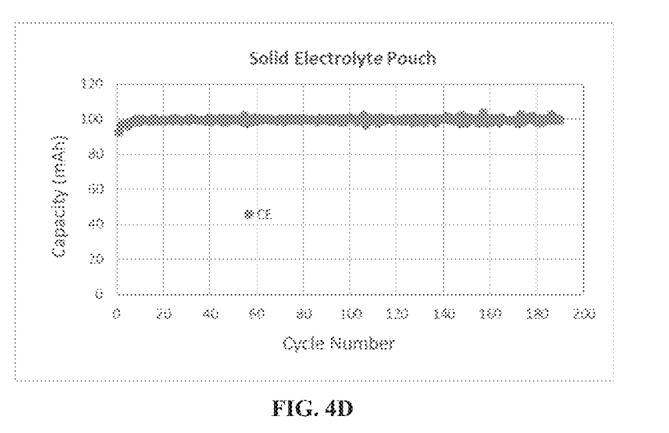

FIGS. 4A to 4D show the cycling performance comparison of pouch cells with liquid electrolyte and solid electrolyte, where LCO is cathode and LiCu is anode. As for the pouch cell with liquid electrolyte, the liquid electrolyte is prepared without the addition of crosslinking agents and initiator. As for the pouch cell with solid electrolyte, the solid electrolyte is prepared from a thermally-curable electrolyte precursor solution including 93% liquid electrolyte, 7% monomer and 2% initiator. The liquid electrolyte is 1 M $LiPF_6$ in solvent of EC/EMC/DEC with additive of FEC, DME and LiDFOB. The monomer is a mixture of polyether and PETMP. The initiator is AVBN. The electrolyte precursor solution is fabricated according to the process shown in FIG. 2. These pouch cells were charged/discharged at 0.1 C for 3 cycles and then charged/discharged at 0.2 C for a longer cycling performance test. As shown in FIG. 4A, the capacity of the pouch cell with liquid electrolyte was slightly decreased in about the first 140 cycles, and the capacity retention at the $140^{th}$ cycle is about 75.2%. However, the capacity of the pouch cell with liquid electrolyte was drastically dropped to zero from about $141^{st}$ to $149^{th}$ cycles. The fast decay of the pouch cell with liquid electrolyte is mainly caused by the penetration of separator by Li dendrite. For lithium metal anode, Li dendrite grows and nucleates during charge/discharge, and also penetrates the separator, resulting in a fast decay and short circuit of the cell. In addition, a significant drop of Coulombic efficiency (CE) was also observed for the pouch cell with liquid electrolyte after about 140 cycles (FIG. 4B). In contrast to the pouch cells with liquid electrolyte, the pouch cells with solid electrolyte of the present invention show good stability and performance. Referring to FIG. 4C, the pouch cells with solid electrolyte had better stability with about 85% capacity retention at about $180^{th}$ cycle. The CE of the pouch cells with solid electrolyte was stable and kept at 98.4% after 180 cycles, suggesting that the solid electrolyte is able to suppress the lithium dendrite growth so as to improve the stability of the pouch cell after cycling test.

Figure 5:
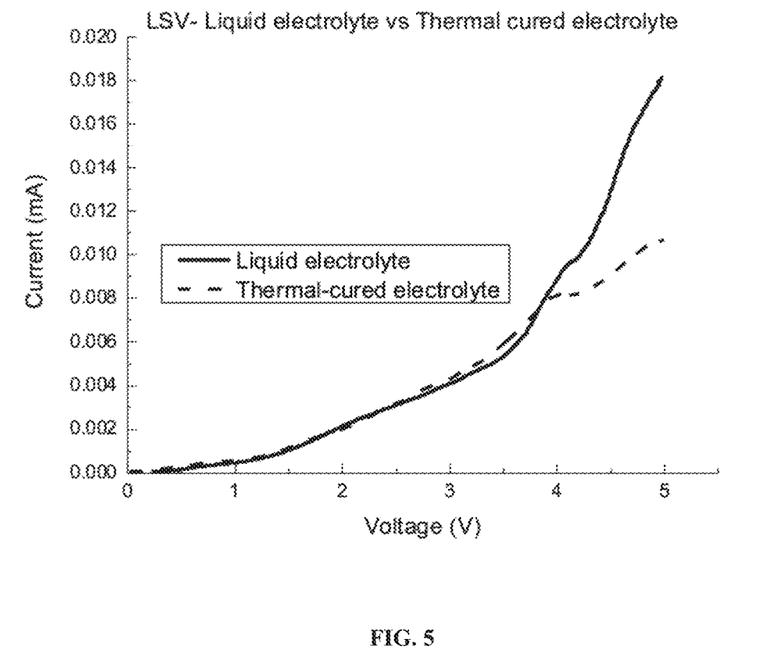
FIG. 5 shows an overall electrochemical stability of the present solid electrolyte (thermal-cured electrolyte) versus a liquid electrolyte in terms of a linear sweep voltammetry (LSV) curve.

FIG. 5 is a linear sweep voltammetry (LSV) curve showing an overall electrochemical stability of the present solid electrolyte which is better than that of a liquid electrolyte. The current value of the present solid electrolyte was comparable to that of the liquid electrolyte at a voltage of ≤3.7V. However, when the voltage is larger than 3.7V, current of the liquid electrolyte became larger than that of the present solid electrolyte, which means that electrochemical side reaction of liquid electrolyte is more than that of the solid electrolyte. Therefore, the present solid electrolyte shows a better electrochemical stability than that of the liquid electrolyte when voltage is larger than 3.7V. The LSV was tested in stainless steel symmetrical batteries. The scan rate was 1 mV s$^{-1}$.

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

The invention claimed is:

1. A rechargeable lithium-ion battery with an in situ thermally-curable electrolyte, comprising:
    at least one cathode with one or more layers selected from lithium manganese oxide, lithium cobalt oxide, lithium nickel manganese cobalt oxide, and/or lithium iron phosphate;
    at least one anode with one or more layers selected from carbon black, carbon nanotubes, lithium metal, graphene, and/or graphite;
    at least one porous separator having a porosity from approximately 30% to 90%;
    a thermally-curable electrolyte precursor solution comprising:
    a first crosslinking agent, wherein the first crosslinking agent is represented by formula (I):

(I), wherein R1, R2, R3 and R4 in formula (I) are jointly or independently selected from epoxy, alkoxy, urethane, CN, ethylene oxide, propylene oxide and alkyl; n is 5000 or less and m, j and k are from 1 to 5000; n, m, j and k are integers, respectively;
    a second crosslinking agent;
    an initiator;
    an electrolyte solvent;
    an electrolyte salt;
    one or more electrolyte additives;
    a monomer mixture of polyether and pentaerythritol tetrakis(3-mercaptopropionate) or a monomer polymerization product of poly propylene oxide-co-ethylene oxide tri-acrylate;
    wherein the viscosity of the thermally-curable electrolyte precursor solution is below 200 cps such that the thermally-curable electrolyte precursor solution is infiltrated within the separator and the pores inside the cathode and anode layers then cured to form porous separator and porous electrodes fully permeated with a solid electrolyte.

2. The rechargeable lithium-ion battery with an in situ thermally-curable electrolyte of claim 1, wherein the second crosslinking agent is represented by formula (II):

(II), wherein R is selected from epoxy, ester, and alkyl groups; wherein x is from 1 to 5000.

3. The rechargeable lithium-ion battery with an in situ thermally-curable electrolyte of claim 1, wherein the initiator is selected from azobis(iso-butyronitrile), 2,2'-azobis(2, 4-dimethylvaleronitrile) and azobisdimethyl-valeronitrile, dimethyl 2,2'-azobis(2-methylpropionate), 2,2'-azobis[2-(2-imidazolin-2-yl)-propane] dihydrochloride, cumene hydroperoxide or di-tert-butyl peroxide.

4. The rechargeable lithium-ion battery with an in situ thermally-curable electrolyte of claim 1, wherein the first crosslinking agent is in an amount of approximately from 1% to 15% by weight.

5. The rechargeable lithium-ion battery with an in situ thermally-curable electrolyte of claim 1, wherein the second crosslinking agent is in an amount of approximately from 1% to 15% by weight.

6. The rechargeable lithium-ion battery with an in situ thermally-curable electrolyte of claim 1, wherein the initiator is in an amount of approximately from 1% to 5% by weight.

7. The rechargeable lithium-ion battery with an in situ thermally-curable electrolyte of claim 1, wherein the electrolyte solvent is in an amount of approximately from 65% to 86% by weight.

8. The rechargeable lithium-ion battery with an in situ thermally-curable electrolyte of claim 1, wherein the electrolyte salt is selected from LiPF$_6$, LiAsF$_6$, LiClO$_4$, LiTFSi, LiBF$_4$, LiCF$_3$SO$_3$, LiN(CF$_3$SO$_2$)$_2$, LiFSI or LiSBF$_6$.

9. The rechargeable lithium-ion battery with an in situ thermally-curable electrolyte of claim 1, wherein the additives are selected from one or more of fluoroethylene carbonate, dimethylglycol, orthoformate fluoride, tris(2,2,2-trifluoroethyl)orthoformate, 1,1,1,3,3,3-hexafluoro-2-propanol, lithium difluoro(ethanedioato)borate, lithium bis(oxalate)borate, vinylene carbonate, 1,3-propane sultone, membrane-forming agents, fire retardants, and/or ceramic particles.

10. The rechargeable lithium-ion battery with an in situ thermally-curable electrolyte of claim 1, wherein the thermally-cured electrolyte precursor solution is cured at 40° C. to 80° C. for approximately 20 minutes to 6 hours.

11. A method for fabricating a rechargeable lithium-ion battery with an in situ thermally-curable electrolyte comprising:
    stacking or rolling at least one cathode, at least one porous separator and at least one anode to form a layered structure;
    inserting the layered structure into a battery housing;
    providing the thermally-curable electrolyte precursor solution of claim 1 and pouring the thermally-curable electrolyte precursor solution into the battery housing;

sealing the battery housing and heating the battery housing to cure the electrolyte precursor solution into a solid electrolyte and form a separator fully infused with the solid electrolyte;

wherein viscosity of the thermally-curable electrolyte precursor solution is below 200 cps such that the thermally-curable electrolyte precursor solution is infiltrated within the separator and the pores inside the cathode and anode layers.

12. The method for fabricating a rechargeable lithium-ion battery with an in situ thermally-curable electrolyte of claim 11, wherein the battery is a pouch battery or a cylindrical battery.

13. The method for fabricating a rechargeable lithium-ion battery with an in situ thermally-curable electrolyte of claim 11, wherein said heating the battery housing is for approximately 20 minutes to 6 hours.

14. The method for fabricating a rechargeable lithium-ion battery with an in situ thermally-curable electrolyte of claim 11, wherein said heating the battery housing to form the solid electrolyte is at approximately from 40° C. to 80° C.

* * * * *